United States Patent
Meixner

(10) Patent No.: US 6,824,846 B1
(45) Date of Patent: Nov. 30, 2004

(54) PACKAGING ENVELOPE

(75) Inventor: Hans-Werner Meixner, Wettenberg (DE)

(73) Assignee: Pi-Patente Gesellschaft mit beschrankter Haftung (GmbH) Entwicklung und Verwertung, Wettenberg (DE)

( * ) Notice: Subject to any disclaimer, the term of this patent is extended or adjusted under 35 U.S.C. 154(b) by 1682 days.

(21) Appl. No.: 08/288,574

(22) Filed: Aug. 10, 1994

Related U.S. Application Data

(63) Continuation-in-part of application No. 07/752,689, filed as application No. PCT/EP90/00390 on Mar. 10, 1990, now abandoned.

(30) Foreign Application Priority Data

Mar. 16, 1989 (DE) .......................... 39 08 585

(51) Int. Cl.[7] .......................... A22C 13/00; B65D 81/34
(52) U.S. Cl. ................. 428/34.8; 428/34.9; 426/105; 426/129; 138/118.1
(58) Field of Search .............................. 428/34.9, 34.8; 138/118.1; 426/105, 129, 138; 383/112, 117, 180

(56) References Cited

U.S. PATENT DOCUMENTS

| | | | |
|---|---|---|---|
| 2,247,312 A | | 6/1941 | Rumsey et al. |
| 2,866,710 A | | 12/1958 | Dowd et al. |
| 3,290,841 A | * | 12/1966 | Sartore ........................ 53/258 |
| 3,624,982 A | | 12/1971 | Marietta, Jr. |
| 3,693,484 A | * | 9/1972 | Sanderson, Jr. .......... 81/176.15 |
| 3,890,675 A | | 6/1975 | Nausedas ..................... 452/42 |
| 4,123,589 A | | 10/1978 | Korlatzki et al. |
| 4,136,203 A | | 1/1979 | Murphy et al. |
| 4,155,212 A | | 5/1979 | Marchese |

(List continued on next page.)

FOREIGN PATENT DOCUMENTS

| | | |
|---|---|---|
| CH | 662543 | 12/1978 |
| DE | 296534 | 6/1927 |
| DE | 1560425 | 1/1968 |
| DE | 2559318 | 7/1977 |
| DE | 2658136 | 6/1978 |
| DE | 2836915 | 2/1980 |
| DE | 2850182 | 6/1983 |
| DE | 2952715 C2 | 8/1983 |
| DE | 3308296 | 9/1983 |
| DE | 3229524 | 2/1984 |
| DE | 3329434 | 2/1984 |
| DE | 3408159 | 9/1985 |
| EP | 175173 | 3/1986 |
| FR | 1560425 | 1/1968 |
| JP | Hei-2-504-206 | 10/1968 |
| JP | Sho-58-161870 | 10/1983 |

OTHER PUBLICATIONS

English translation of Abstract of Utility Model Application No. Sho–55–16032.

(List continued on next page.)

Primary Examiner—Rena L. Dye
(74) Attorney, Agent, or Firm—Collard & Roe, P.C.

(57) ABSTRACT

Packaging envelope or packaging bag consisting of at least two plies, of which the one ply is elastic and the other ply is a gas-barrier layer. The inner ply can consist of a food-compatible material, so that foods, in particular meat, can be placed in the packaging envelope or the packaging bag. For packaging, the envelope is expanded and the object then inserted. After the insertion, the envelope contracts through its flexibility in the direction of the center line of the envelope and automatically presses the air present between object and envelope out of the packaging. In the packaging of shapable objects, in particular meat, the envelope presses these objects, in particular the meat, simultaneously into an at least approximately circular cross-sectional shape through the exerted radial forces. The gas-barrier layer prevents the entry of air through the envelope material even for a lengthy storage period.

27 Claims, 2 Drawing Sheets

U.S. PATENT DOCUMENTS

| | | | |
|---|---|---|---|
| 4,287,217 A | 9/1981 | Hammer et al. | |
| 4,470,171 A | 9/1984 | Rusmussen et al. | |
| 4,696,079 A | 9/1987 | Kawai et al. | |
| 4,748,720 A | 6/1988 | Pehr | |
| 4,910,034 A | 3/1990 | Winkler | 426/420 |
| 4,958,477 A | 9/1990 | Winkler | 53/138.3 |
| 5,147,671 A | 9/1992 | Winkler | 426/140 |

OTHER PUBLICATIONS

English translation of Abstract of laid–open patent publication Sho–57–96923.

German Utility Model No. 8,709,475.4.

German Published Patent Application No. 2,559,086.

Gerhard Effenberger: "Artificial Sausage Skins, Manufacture, Properties, Usage" Rheinhessen Printing Workshop Publications Alzey.

* cited by examiner

PACKAGING ENVELOPE

CROSS-REFERENCE TO RELATED APPLICATION

This patent application is a continuation-in-part of U.S. patent application Ser. No. 07/752,689 filed Sep. 6, 1991, which is a 371 of PCT/EP90/00390 filed Mar. 10, 1990, now abandoned.

The invention relates to a packaging envelope for the packaging of objects, in particular of meat, but also of other objects which are to be vacuum-packed. Such packagings customarily envelop the objects loosely at first, and the air is then withdrawn from the packaging envelope by special measures so that the envelope, due to the external air pressure, wraps itself closely round the object.

Such a vacuum packaging of objects is very involved, as the air first has to be removed from the envelope after insertion of the object into the envelope, after which the ends of the envelope are closed, for example welded, so that the packed object with the envelope closely wrapped round it is vacuum-packed in standard terminology. The closing of the ends of the envelope needs to be done at one side only if the envelope is formed as a bag.

In the case of meat, it is often of advantage to force the meat into an approximately round cross-sectional shape, in particular an approximately circular cross-sectional shape. For this purpose the provision of elastic netting is known (FR-PS 1 560 425, EP 0 175 173 A1, U.S. Pat. No. 4,155,212, CH-PS 662 543 A5). Moreover devices for filling the meat into this netting are known (U.S. Pat. No. 4,155,212).

Such netting serves to keep the filled-in joint of meat in its shape and also to press it into a shape which has an approximately circular cross section. This applies in particular to pork such as Casseler or rolled pork.

If the meat is introduced into expandable rubber netting according to the prior art, a very great tension is applied to the meat in radial direction to the center line of the packaging after introduction into the rubber netting, i.e. the threads of the netting leave the meat in the cross-sectional round shape or even press it into a round cross-sectional shape if the original joint of meat was not round. This also applies when the meat is tied by means of cords or the like.

Netting is, however, not packaging within the meaning of the invention, as the air and any other contaminant can reach the packed commodity without hindrance through the meshing of the netting.

For shaping meat into a round form, such netting or tying procedures could also be applied in principle to beef (roast beef, fillet of beef or the like). This is, however, not economically efficient and raises the wholesale price substantially. Tying procedures are not consumer-friendly because the tying material has to be removed prior to the meat being sold and imprints and possibly damage are left on the meat by the tying. If the meat is to be protected from external influences, which is normally the case, it must be packed in addition when netting is used.

A further disadvantage is that the threads of the netting often adhere to the meat, so that the surface of the meat is damaged on detachment of the netting. For this reason a backing (CH-PS 662 543 A5) has already been provided between netting and meat surface, as has an edible gelatin layer (EP 0 175 173 A1). These backings do not contribute towards shaping the meat, nor do they press the air between envelope and meat out automatically, because the cords of the netting contact the meat closely and, even if an envelope is enclosed in the elastic netting, air pockets remain in the envelope in the meshing of the netting.

Moreover, the rubber cords of the netting cause meat juice to escape because the cords of the netting contact the meat linearly and exert great pressure on the meat along these lines.

U.S. Pat. No. 4,155,212 shows a device for packaging meat. Various envelopes are proposed as packaging material:

a) Elastic Netting

This elastic netting is not a packaging for the reasons stated above and is therefore eliminated. b) Monoplane Material If a flexible material is meant with this material according to U.S. Pat. No. 4,155,212, then this material is verifiably not usable on the packaging device described in U.S. Pat. No. 4,155,212 because such an envelope cannot be withdrawn from the tube through which the meat is pushed. For the envelope must be placed with great pre-tension on the tube so that is contracts elastically after being withdrawn from the tube. In this configuration the envelope sticks, as it were, on the tube and cannot be withdrawn from the tube. It has been shown that the envelope tears in this process. But even if a use of a elastic foil as packaging for the meat were to be made possible by modifying the packaging device, this foil is not suitable for serving as vacuum packaging as this material is not gas-impermeable. Gas-impermeability is attained only in connection with a second foil serving as a gas-impermeable layer in interaction with a first elastic foil according to the invention.

It is the object of the invention to provide a packaging envelope or a packaging bag which contracts after introduction of the commodity into the envelope or the bag in such a way that the air between the filled-in commodity and the envelope is pressed out automatically.

It is the second object of the invention to provide a packaging which induces a shaping of the contents into an approximately circular shape, which simultaneously packages the contents, in particular the meat, i.e. provides protection from external influences.

It is the third object of the invention to maintain this attained approximately round cross-sectional shape even for a lengthy storage period.

It is the fourth object of the invention to maintain the attained air exclusion after the closing of the envelope or of the bag (vacuum packing) even for a lengthy period, i.e. to prevent the ambient air from migrating through into the packaging.

All these objects are solved according to claims 1 and 2.

Due to the genuine elasticity of the packaging material, the air between contents and packaging is forced out in that the packaging material wraps itself closely round the contents closely. The subsequently resulting radial tension of the packaging envelope or of the packaging bag on the contents causes a shaping of the contents into a round (circular) cross section. As this radial tension is also retained in the long term in the case of genuine elasticity, this tendency to round shaping is also retained throughout the storage period, and an exchange between ambient air and contents after the closing of the packaging is prevented even for a length period by the second foil as a gas-impermeable layer.

In a further configuration of the invention, the packaging can be formed in such a way that foods in particular can be packed in it, i.e. so that the foil (layer/ply) of the packaging envelope or of the packaging bag coming into contact with the filled-in food consists of a food-compatible material. This foil (layer/ply) can consist of a correspondingly selected plastic material, whereby the food-compatibility of a plastic depends on the type of food to be packed, because each food reacts differently to the composition of the plastic.

If the gas-impermeable layer comes into contact with the food, it must be food-compatible. If the gas-impermeable layer itself is not food-compatible, the packaging envelope can have a third foil (layer/ply) which is provided inside the envelope and imbeds the gas-impermeable layer, as it were. This foil (layer/ply) then comes into contact with the food in the packaging process and must be food-compatible.

BRIEF DESCRIPTION OF THE DRAWINGS

Embodiments of the invention are shown on the drawing, wherein.

Figure 1:
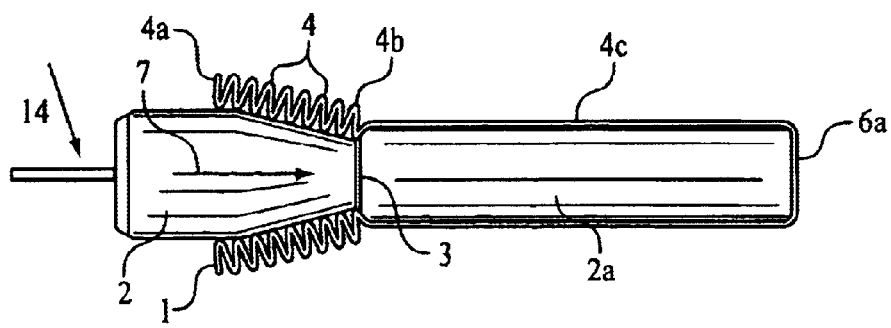
FIG. 1 shows a preliminary embodiment for the packaging of a joint of meat in side view.

According to FIG. 1, a joint of meat (2) is pushed through a funnel (1) and is compressed in its cross section at the end (3) of the funnel. A elastic packaging sleeve (4) is drawn onto the funnel (1) in such a way that it has expanded on the funnel at the left-hand end (4a) and displays its narrowest diameter at the right-hand end (4b). An adequate supply of the packaging sleeve is located relatively loosely on the funnel (1) and can be readily withdrawn from the funnel. The joint of meat (2) is pushed in the direction of the arrow (7) through the end (3) of the funnel (1) as a joint compressed in its cross section (5) into the piece of packaging sleeve (6) which is somewhat smaller in its cross section, and therefore takes this with it even without one end of the packaging sleeve being previously welded, i.e. withdraws a corresponding length of the packaging sleeve (4) from the funnel (1). A surplus length, with which the welding is then undertaken, is customarily left at the beginning and at the end of the packaging sleeve. The packaging sleeve (4) then wraps itself closely round the joint of meat (2) elastic as a piece of packaging sleeve (4c), so that the air between packaging sleeve (4) and joint of meat (2) is withdrawn automatically from the sleeve. The welding of the ends of the sleeve can therefore be executed immediately after the joint of meat has been filled into the sleeve.

Figure 3:
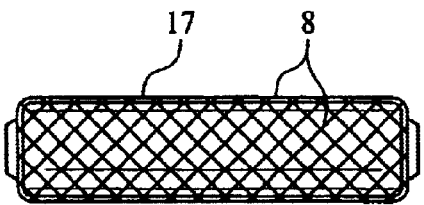
FIG. 3 shows a modified configuration.
Figure 4:
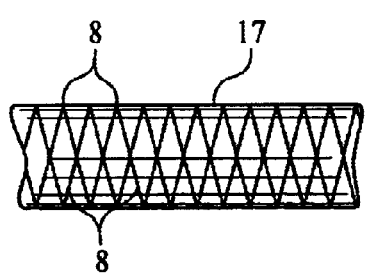
FIG. 4 shows a longitudinal section through FIG. 3.

According to FIGS. 3 and 4, the packaging sleeve (17) is connected in addition to rubbery netting (8) which supports the contraction of the packaging sleeve (17).

Figure 6:
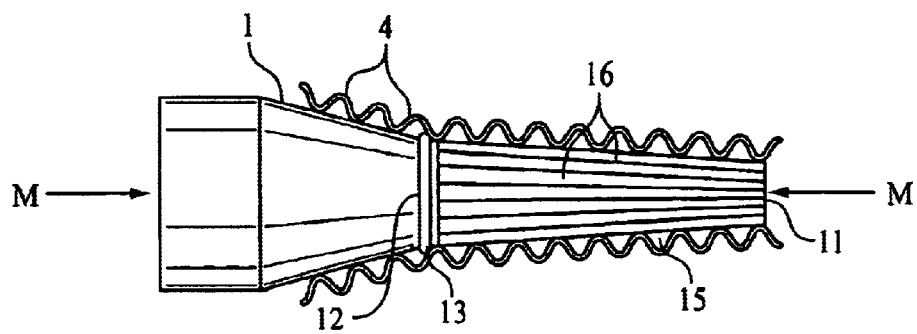
FIG. 6 shows a further embodiment of the meat-infeed device.

According to FIG. 6, the meat is pushed once again through a funnel (1), which in the present case is made of plastic material. Its left-hand end corresponds to the maximum diameter of the joint of meat. Spring-mounted rods (16) which are reduced in their cross section towards the discharge opening (11) are located to the center line M—M at the right-hand end of the funnel (1). The discharge diameter corresponds approximately to half the inlet diameter (12). It Is compressed by the rods (16) through the pushing-through of the joint of meat, and the rods (16) themselves spring apart in this process. The packaging sleeve (4) mounted on the funnel (1) can be supplied by the manufacturer in this form already mounted on the funnel. The rods (16) are connected with the funnel (1) by slipping on a ring (13). The pushed-through meat presses apart the rods (16) and thus also expands the packaging sleeve (4) withdrawn from the funnel (1) in radial direction with reference to the center line M—M of the packaging sleeve (4), so that the latter wraps itself closely round the meat at the discharge opening (11), pressing out the air between packaging sleeve (4) and joint of meat (2) and exerting a constant pressure after this procedure on the meat radially to the center line M—M of the packaging sleeve.

Figure 2:
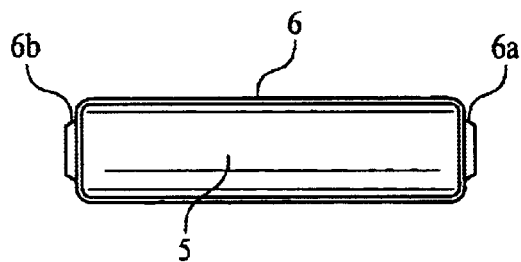
FIG. 2 shows the packaged joint of meat in accordance with FIG. 1.

In this configuration the packaging sleeve can be withdrawn from the rods (16) or the funnel (1) with simultaneous expansion without any great force being applied. The rods (16) or the tapering part of the funnel (1) simultaneously compress the meat, so that the joint of meat can be readily pushed into the packaging sleeve, whereby the latter is easily withdrawable from the funnel or the rods on being pushed through the funnel and/or the rods. When the joint of meat and the packaging sleeve have left the funnel or the rods, the meat then tends to expand and the packaging sleeve tends to contract. The packaging sleeve therefore wraps itself closely round the joint of meat, so that the air between joint of meat and packaging sleeve is pressed out of the packaging and the packaging sleeve continues thereafter on account of its elasticity to exert a constant pressure on the meat in the direction of the center line M—M of the packaging sleeve and presses the latter into a round, preferably circular cross-sectional shape according to FIGS. 2 and 3.

At the beginning and at the end of the joint of meat, as outlined above, a surplus length of packaging sleeve is left, which is welded, for example, after the air has been pressed out of the packaging sleeve. The welding can be done in this process at both ends (6a, 6b) simultaneously.

Figure 5:
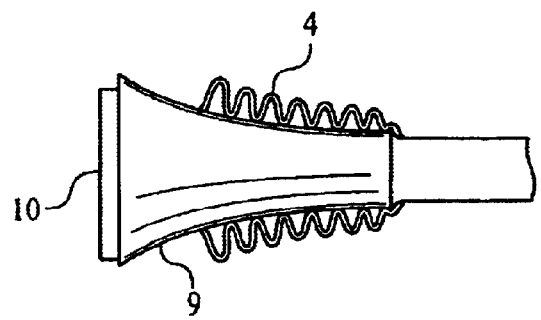
FIG. 5 shows a modified configuration of the meat-infeed device.

According to FIG. 5, the elastic packaging sleeve (4) is supplied by the manufacturer on a conical plastic part (9) as a substitute for the funnel (1) of FIG. 1 and already fitted with the packaging sleeve. The part (9) can be connected to the infeed mechanism (10) and where applicable to the rods (16).

Figure 7A:
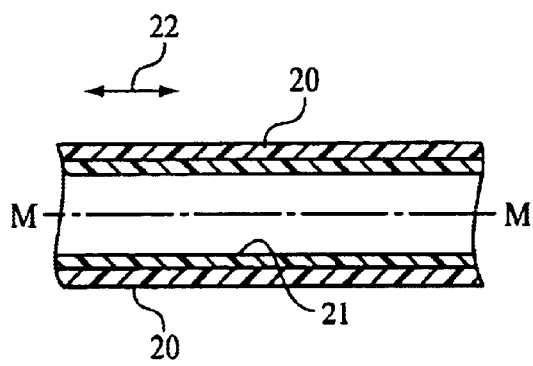
FIG. 7a and FIG. 7b show a longitudinal section through an envelope.
Figure 7B:
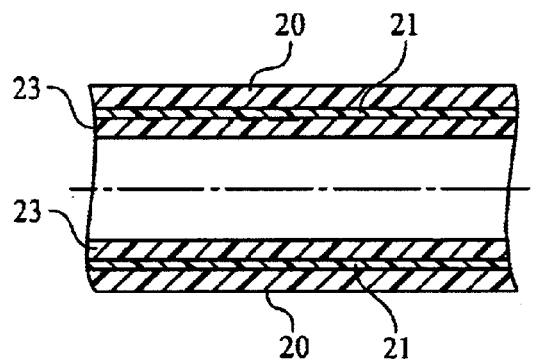

FIGS. 7a and 7b show embodiments of the packaging sleeve in longitudinal section. The packaging sleeve consists of an external elastic foil (layer/ply) (20) which consists advantageously of a elastic plastic, for example an elastomeric polyurethane, in such a way that it can be expanded radially to the center line M—M away from the center line but also, if the expansion forces are no longer present, contracts again radially to the center line M—M. A contraction also takes place in the longitudinal direction of the packaging sleeve in the direction of the arrow (22) if the packaging sleeve is stretched on being withdrawn from the funnel in this direction. On the inside the plastic foil (20) has a gas-impermeable foil (layer/ply) (21) made of a plastic, for example PVDC or EVOH. The gas-impermeable foil can be regarded in practical terms as air-impermeable.

Besides meat, any objects which are to be packaged airtight and for which it is expedient to produce a shaping towards a round (circular) cross section, in order for example to save space, can be inserted into this packaging sleeve. Purely optical reasons may naturally be of advantage for the round shaping. Examples of objects coming into question are insulating materials such as glass wool and the like or litter for domestic pets.

If the plastic foil coming into contact with the contents is food-compatible, foods can be placed in such a packaging and vacuum-packed as it were, for example, shapable cheese.

FIG. 7b shows a modified configuration. Here, too, the elastic plastic foil (20) is provided which bears the gas-impermeable foil (21). If the gas-impermeable foil (21) is not food-compatible, a further plastic foil (layer/ply) (23) can be applied to this foil (21), which should then be food-compatible if foods are to be packaged in the packaging sleeve according to FIG. 7b. The food-compatible foil (21) is positioned inside the packaging sleeve.

Figure 8A:
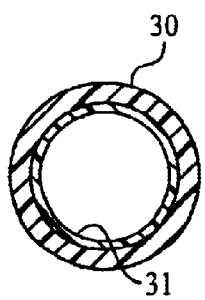
FIG. 8a, FIG. 8b, FIG. 8c show sections through one envelope respectively.

FIG. 8a shows a cross section through the packaging sleeve. The sleeve of FIG. 8a, which corresponds to the packaging sleeve according to FIG. 7a, consists of two plastic foils (30 and 31). The plastic foils (30 and 31) are produced by the extrusion procedure in such a way that the materials of the plastic foils (30 and 31) are superimposed and bonded as it were immediately on leaving the extruder. In practice it is customary to use a bonding layer between the two plastic foils (30 and 31). Using the same procedure, a three-ply packaging sleeve or a packaging sleeve with further plies can be produced by the same procedure.

Figure 8B:
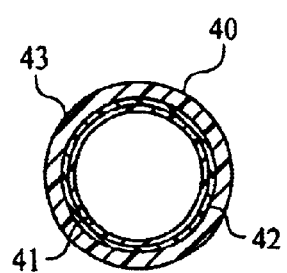

According to FIG. 8b the packaging sleeve has been produced from two packaging sleeve lengths (40 and 41). The lengths (40 and 41) represent the multi-ply packaging material. These lengths are initially superimposed as flat lengths and welded together at their longitudinal edges in this form, so that the packaging envelope assumes the shape of FIG. 8b with two longitudinal seams (42 and 43) for introduction of the object to be packaged.

Figure 8C:
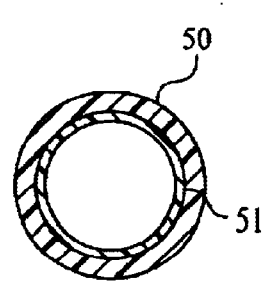

In a corresponding manner the packaging sleeve can be produced by laying out a packaging sleeve length (50) and folded it in, using known, provided shaping cones, in such a way that it assumes the shape according to FIG. 8c in the cross section. The packaging sleeve length (50) is then welded at the contacting edges (51) and then has only one longitudinal seam.

What is claimed is:

1. Packaging envelope for the packaging of formable meat, in combination with formable meat, comprising
    (a) at least two layers of superimposed plastic foils, of which at least one plastic foil is elastic and the other plastic foil is at least virtually gas-impermeable;
    (b) said packaging envelope is permanently elastic;
    (c) said packaging envelope stretches immediately before and upon the placement of said formable meat in the elastic envelope;
    (d) said packaging envelope spontaneously contracts in its cross-section after placement of the meat and automatically forces out air present between the packaging envelope and the meat; and
    (e) said packaging envelope forces the formable meat into a nearly circular cross-section shape after it is placed in the packaging envelope; and
    wherein said packaging envelope has an expandability selected from the group consisting of a radially elastic expandability of at least 50% of the circumference of the envelope in cross-section and an elastic longitudinal expandability of at least 25%, and a combination of a radially elastic expandability of at least 50% of the circumference of the envelope in cross-section and an elastic longitudinal expandability of at least 25%.

2. Packaging envelope according to claim 1, wherein at least the plastic foil coming into contact with the meat is food-compatible.

3. Packaging envelope according to claim 1, comprising three superimposed plastic foils, of which the outer plastic foils are elastic and the interposed plastic foil is virtually gas-impermeable.

4. Packaging envelope according to claim 1, wherein the plastic foils are loosely superimposed.

5. Packaging envelope according to claim 1, wherein the plastic foils are welded together with their superimposed surfaces.

6. Packaging envelope according to claim 1, wherein the plastic foils are bonded together with their surfaces.

7. Packaging envelope according to claim 1, wherein the individual plastic foils are bonded together in the extrusion procedure during manufacture.

8. Packaging envelope according to claim 1, wherein the virtually gastight plastic foil is a gas-barrier layer vapor-deposited onto the at least one elastic plastic foil.

9. Packaging envelope according to claim 8, wherein the gas-barrier layer is a vapor-deposited aluminum layer.

10. Packaging envelope according to claim 1, wherein the packaging envelope is seamless.

11. Packaging envelope according to claim 1, wherein the longitudinal edges of the at least one elastic plastic foil and the virtually gas-impermeable plastic foil are welded together to form a sleeve with a longitudinal seam.

12. Packaging envelope according to claim 1, wherein the at least one elastic plastic foil and the virtually gas-impermeable plastic foil form a multi-layer length, and wherein two such multi-layer lengths are superimposed and ther longitudinal edges are welded together.

13. Packaging envelope according to claim 1, wherein the packaging envelope has two longitudinal welds.

14. Packaging envelope according to claim 1, wherein the packaging envelope is a sleeve open at both ends for filling in the meat.

15. Packaging envelope according to claim 1, wherein the packaging envelope for filling in the meat is a bag open at one end and closable here and closed at the other end.

16. Packaging envelope according to claim 1, wherein it serves the packaging of shapable meat which is to be packed airtight.

17. Packaging envelope according to claim 1, wherein it serves the packaging of shapable meat foods which are to be packaged airtight.

18. Packaging envelope according to claim 1, wherein it forces the meat after the filling into the envelope into an approximately circular cross-sectional shape.

19. Packaging envelope according to claim 1, wherein the packaging envelope is weldable for closing.

20. Packaging envelope according to claim 1, wherein the ends are closable by mechanical means.

21. Packaging envelope according to claim 1, wherein the envelope or the bag is elastic in radial direction towards the center line of the envelope.

22. Packaging envelope according to claim 1,
wherein the envelope or the bag is elastic in longitudinal direction.

23. Packaging envelope according to claim 1,
wherein the envelope is elastic both in radial direction towards the center line and in longitudinal direction parallel to the center line.

24. Packaging envelope for the packaging of formable meat, in combination with formable meat, comprising
   (a) at least two layers of superimposed plastic foils, of which at least one plastic foil is elastic and the other plastic foil is at least virtually gas-impermeable;
   (b) said packaging envelope is permanently elastic;
   (c) said packaging envelope stretches immediately before and upon the placement of said formable meat in the elastic envelope;
   (d) said packaging envelope spontaneously contracts in its cross-section after placement of the meat and automatically forces out air present between the packaging envelope and the meat; and
   (e) said packaging envelope forces the formable meat into a nearly circular cross-section shape after it is placed in the packaging envelope; and
wherein the packaging envelope has a radially elastic expandability of at least 50% of the envelope circumference in the cross section and an elastic longitudinal expandability of at least 25%.

25. Packaging envelope according to claim 1,
wherein the envelope material has an elastic rubber net which is located in the envelope material or on the envelope material.

26. Packaging envelope according to claim 1,
wherein it is mounted on a cylindrical or conical part which is connectable with a filling machine for the meat.

27. Packaging envelope according to claim 1,
wherein the envelope or the bag is mounted on radially elastic rods and the rods are arranged in a ring with a tapering cross section, and these rods are connected with a conical part connectable with a filling machine.

\* \* \* \* \*